US009595786B1

(12) United States Patent
Takano et al.

(10) Patent No.: US 9,595,786 B1
(45) Date of Patent: Mar. 14, 2017

(54) NARROW WIDTH ADAPTERS AND CONNECTORS WITH SPRING LOADED REMOTE RELEASE

(71) Applicant: Senko Advanced Components, Inc., Marlborough, MA (US)

(72) Inventors: Kazuyoshi Takano, Southborough, MA (US); Jeffrey Gniadek, Northbridge, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/996,865

(22) Filed: Jan. 15, 2016

(51) Int. Cl.
| | |
|---|---|
| H01R 4/50 | (2006.01) |
| H01R 13/625 | (2006.01) |
| H01R 13/627 | (2006.01) |
| H01R 13/629 | (2006.01) |
| G02B 6/42 | (2006.01) |

(52) U.S. Cl.
CPC ......... *H01R 13/627* (2013.01); *G02B 6/4284* (2013.01); *H01R 13/6271* (2013.01); *H01R 13/6272* (2013.01); *H01R 13/6275* (2013.01); *H01R 13/62933* (2013.01)

(58) Field of Classification Search
CPC .............. H01R 13/627; H01R 13/6271; H01R 13/6272; H01R 13/6275; H01R 13/62933; G02B 6/4284
USPC ........ 385/76, 77, 88, 92; 439/133, 304, 345, 439/346, 350, 352, 353, 354, 357, 358, 439/370
See application file for complete search history.

(56) References Cited

U.S. PATENT DOCUMENTS

| | | | |
|---|---|---|---|
| 5,845,036 A | * | 12/1998 | De Marchi .......... G02B 6/3825 385/139 |
| 6,276,840 B1 | | 8/2001 | Weiss et al. |
| 6,668,113 B2 | | 12/2003 | Togami et al. |
| 7,052,186 B1 | | 5/2006 | Bates |
| 7,473,124 B1 | | 1/2009 | Briant et al. |
| 8,556,645 B2 | * | 10/2013 | Crain .................. H01R 13/6272 438/258 |
| 2003/0063862 A1 | | 4/2003 | Fillion et al. |
| 2006/0140543 A1 | | 6/2006 | Abendschein et al. |
| 2010/0239220 A1 | | 9/2010 | Lin et al. |

(Continued)

OTHER PUBLICATIONS

"Development of mini-MPO connector" by Shimoji et al, Furukawa Review, 1999 (available online since at least Jul. 16, 2011).*

(Continued)

*Primary Examiner* — Robert Tavlykaev
(74) *Attorney, Agent, or Firm* — Pepper Hamilton LLP

(57) ABSTRACT

Narrow width fiber optic connectors having spring loaded remote release mechanisms to facilitate access and usage of the connectors in high density arrays. A narrow pitch connector comprises a plurality of LC connectors wherein a pitch of said narrow pitch connector is less than about 5.25 mm, for example about 4.8 mm, a plurality of latching arms coupled to the plurality of LC connectors, a housing configured to hold the plurality of LC connectors, and a pull tab coupled to the plurality of latching arms and configured to remotely unlatch the narrow pitch connector, The pull tab may include a spring configured to provide a force such that the latching arms return to an undisplaced position. In another embodiment, a narrow width multi-fiber connector has a width less than or equal to about 9.6 mm.

18 Claims, 16 Drawing Sheets

(56) References Cited

U.S. PATENT DOCUMENTS

| | | |
|---|---|---|
| 2011/0058773 A1 | 3/2011 | Peterhans et al. |
| 2011/0267742 A1 | 11/2011 | Togami et al. |
| 2012/0155810 A1 | 6/2012 | Nakagawa |
| 2012/0237177 A1 | 9/2012 | Minota |
| 2014/0056562 A1* | 2/2014 | Limbert .................. G02B 6/36 385/77 |
| 2015/0030289 A1* | 1/2015 | Jiang .................... G02B 6/3898 385/76 |
| 2015/0111417 A1 | 4/2015 | Vanderwoud |

OTHER PUBLICATIONS

International Search Report and Written Opinion dated Mar. 17, 2016 from corresponding International Application No. PCT/US16113629, International Filing Date Jan. 15, 2016.

International Search Report and Written Opinion dated May 6, 2016 from related International Application No. PCT/US16/18476, International Filing Date Feb. 18, 2016.

* cited by examiner

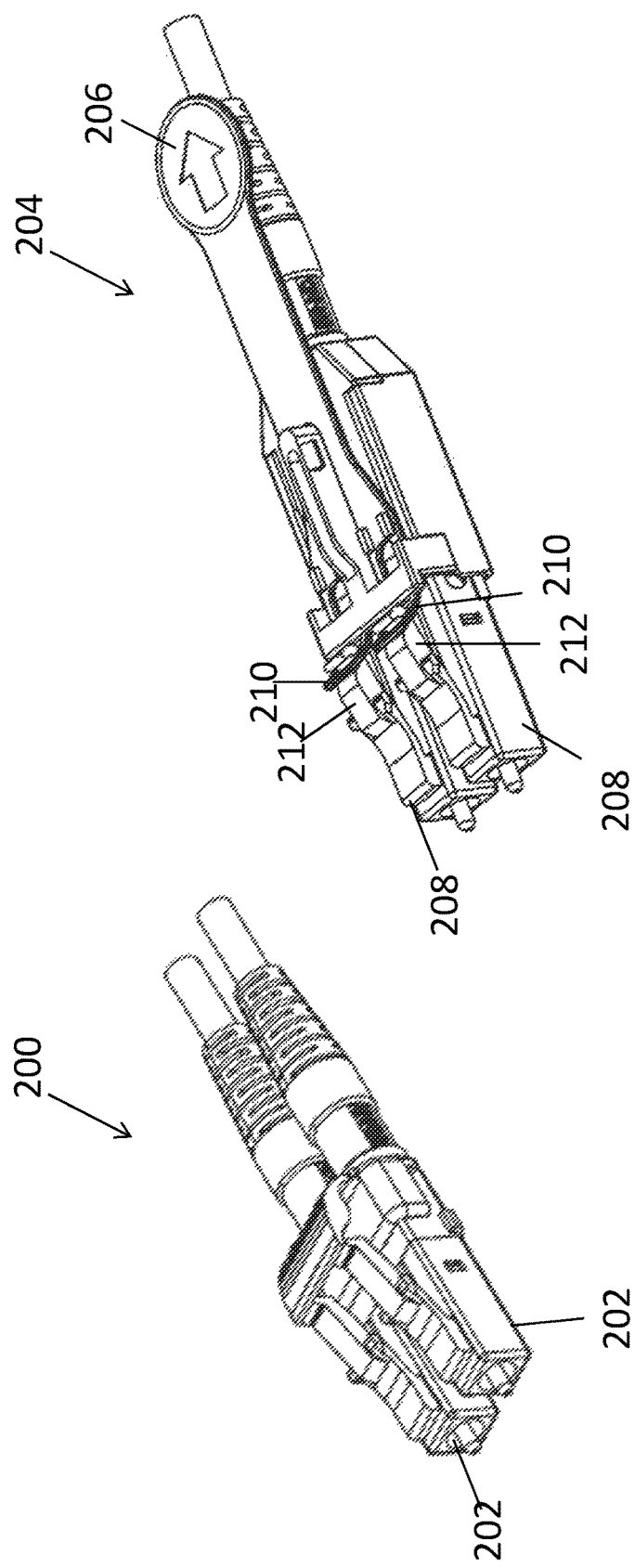

NARROW WIDTH ADAPTERS AND CONNECTORS WITH SPRING LOADED REMOTE RELEASE

BACKGROUND

The present disclosure relates generally to connectors having remote release, and more specifically to narrow width adapters and connectors, such as narrow pitch distance LC duplex adapters and connectors with spring loaded remote release, and narrow width multi-fiber connectors.

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, the deployment of high-density interconnect panels have not been fully realized.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Over-stressing the cables and connectors may produce latent defects, compromise the integrity and/or reliability of the terminations, and potentially cause serious disruptions to network performance.

While an operator may attempt to use a tool, such as a screwdriver, to reach into the dense group of connectors and activate the release mechanism, the adjacent cables and connectors may obstruct the operator's line of sight, making it difficult to guide the tool to the release mechanism without pushing aside the surrounding cables. Moreover, even when the operator has a clear line of sight, guiding the tool to the release mechanism may be a time-consuming process. Thus, using a tool may not be effective at reducing support time and increasing the quality of service.

Small Form Factor Pluggable Transceivers (SFP) are used presently in telecommunication infrastructures within rack mounted copper-to-fiber media converters, and are also known as Ethernet switches and/or patching hubs. These infrastructure Ethernet and fiber optic connections are evolving daily to increase connection density due to limited space for such equipment. Although fiber optic connectors have become smaller over the years, they have not been designed to be any smaller than necessary to plug into commonly sized and readily available SFPs. However, as transceiver technologies develop, smaller SFPs will be used to create higher density switches and/or patching hub equipment. Accordingly, there is a need for fiber optic connectors that will meet the needs of future developments in smaller SFPs.

SUMMARY

Aspects of the present disclosure are directed to providing adapters and fiber optic connectors for future developments in smaller SFPs, including for example narrow pitch SFPs for LC type duplex connectors, as well as narrow width SFPs for MPO connectors. Aspects of the present disclosure also provide spring loaded remote release mechanisms to facilitate access and usage of the narrow pitch connectors in high density arrays or panels.

According to one aspect, there is provided a narrow pitch fiber optic connector comprising a plurality of LC connectors arranged such that a pitch of said narrow pitch connector is less than about 5.25 mm, a plurality of latching arms coupled to the plurality of LC connectors, a housing configured to hold the plurality of LC connectors, and a pull tab coupled to the plurality of latching arms and configured to remotely unlatch the narrow pitch connector. In some embodiments, the pitch may be less than or equal to about 4.8 mm.

In some embodiments, the pull tab may include a spring configured to provide a force such that the latching arms return to an undisplaced position. The pull tab may include a distal end for remotely unlatching the narrow pitch connector and a proximal end configured to couple the pull tab to the plurality of latching arms. The proximal end may include a single prong configured to engage the plurality of latching arms. The proximal end may include a plurality of pins configured to slide along a semi-circular profile of the plurality of latching arms. In various embodiments, the narrow pitch connector is a duplex connector.

In various embodiments, the housing may include a bottom housing and a top housing coupled to the bottom housing. The bottom housing may include a side wall configured to open. The side wall may include a raised profile at a rear end thereof. The top housing may be configured to retain the pull tab. The pull tab may be further configured to be pushed down so as to unlatch the narrow pitch connector without resulting in any horizontal movement of the pull tab.

According to another aspect, there is disclosed a duplex fiber optic connector comprising two LC connectors arranged such that a pitch of said duplex LC connector is less than about 5.25 mm, and a pull tab coupled to said two LC connectors so as to remotely unlatch said duplex connector when pulled horizontally, wherein the pull tab is spring loaded. In one embodiment, the pitch may be less than or equal to about 4.8 mm.

In some embodiments, the pull tab may include a proximal end configured to couple to respective latching arms of the two LC connectors. The duplex fiber optic connector may further comprise a housing having side walls configured to open. The housing may further comprise a top housing configured to receive the pull tab. The pull tab may be further configured to be pushed down so as to unlatch the duplex connector without resulting in any horizontal movement of the pull tab.

According to another aspect, there is disclosed a narrow pitch adapter comprising a recess configured to receive a duplex fiber optic connector having a pitch less than about 5.25 mm. In some embodiments, the pitch may be less than or equal to about 4.8 mm.

According to another aspect, there is disclosed a narrow width fiber optic connector comprising a multi-fiber connector, wherein a width of said narrow width fiber optic connector is less than about 12.4 mm, at least one latching arm coupled to the multi-fiber connector, a housing configured to hold the multi-fiber connector, and a pull tab coupled to the at least one latching arms and configured to remotely unlatch the narrow width connector. The multi-fiber connector may include a multi-fiber MT ferrule. In some embodiments, the width may be less than or equal to about 9.6 mm. In some embodiments, the pull tab may include a spring configured to provide a force such that the at least one latching arm returns to an undisplaced position.

BRIEF DESCRIPTION OF THE DRAWINGS

FIG. 2A is a perspective view of a prior art LC duplex connector;

FIG. 2B is a perspective view of a prior art LC duplex connector with a remote release pull tab;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, an SC connector, an SC duplex connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide a remote release mechanism such that a user can remove cable assembly connectors that are closely spaced together on a high density panel without damaging surrounding connectors, accidentally disconnecting surrounding connectors, disrupting transmissions through surrounding connectors, and/or the like. Various embodiments also provide narrow pitch LC duplex connectors and narrow width multi-fiber connectors, for use, for example, with future narrow pitch LC SFPs and future narrow width SFPs. The remote release mechanisms allow use of the narrow pitch LC duplex connectors and narrow width multi-fiber connectors in dense arrays of narrow pitch LC SFPs and narrow width multi-fiber SFPs.

Figure 1B:
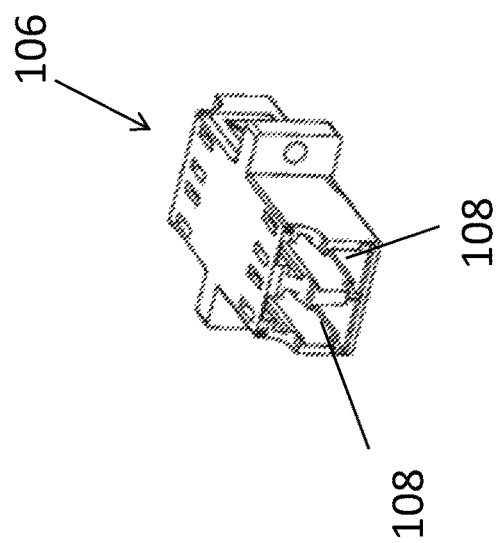
FIG. 1B is a perspective view of a prior art standard 6.25 mm pitch LC adapter.
Figure 1A:
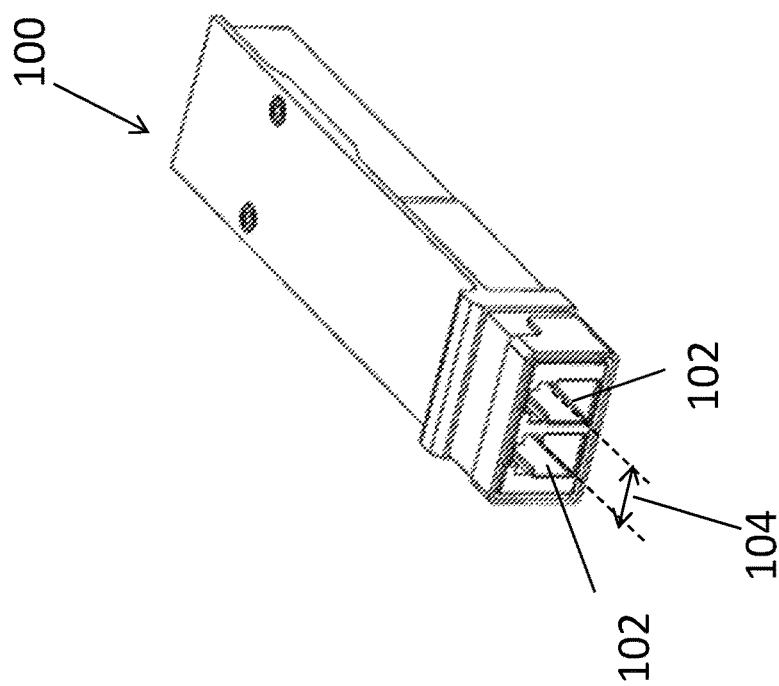
FIG. 1A is a perspective view of a prior art standard 6.25 mm pitch LC connector SFP.
Figure 1C:
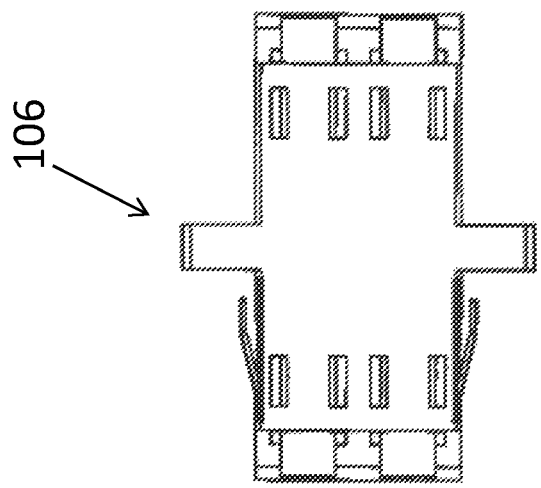
FIG. 1C is a top view of the prior art adapter of FIG. 1B.
Figure 1D:
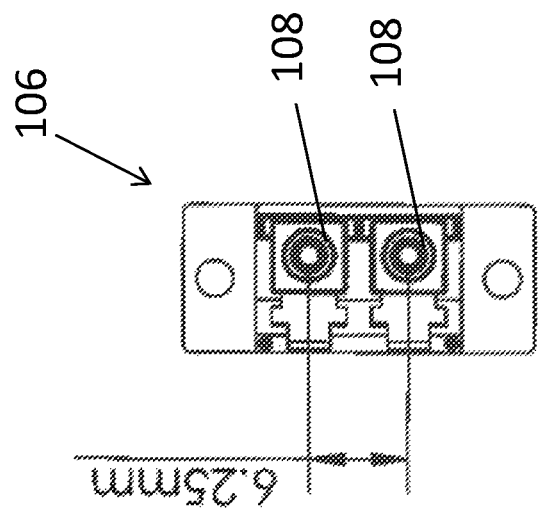
FIG. 1D is a front view of the prior art adapter of FIG. 1B, showing the 6.25 mm pitch.

FIG. 1A shows a perspective view of a prior art standard 6.25 mm pitch LC connector SFP 100. The SFP 100 is configured to receive a duplex connector, and provides two receptacles 102, each for receiving a respective LC connector. The pitch 104 is defined as the axis-to-axis distance between the central longitudinal axes of each of the two receptacles 102. FIG. 1B shows a perspective view of a prior art standard 6.25 mm pitch LC adapter 106. The adapter 106 is also configured to receive a duplex connector, and provides two receptacles 108, each for receiving a respective LC connector. FIG. 1C is a top view of the adapter 106 of FIG. 1B. The pitch 110 of the adapter 106 is defined similarly to that of the SFP 100, as the axis-to-axis distance between the central longitudinal axes of each of the two receptacles 108, as illustrated in FIG. 1D, which shows a front view of the adapter 106.

Figure 2C:
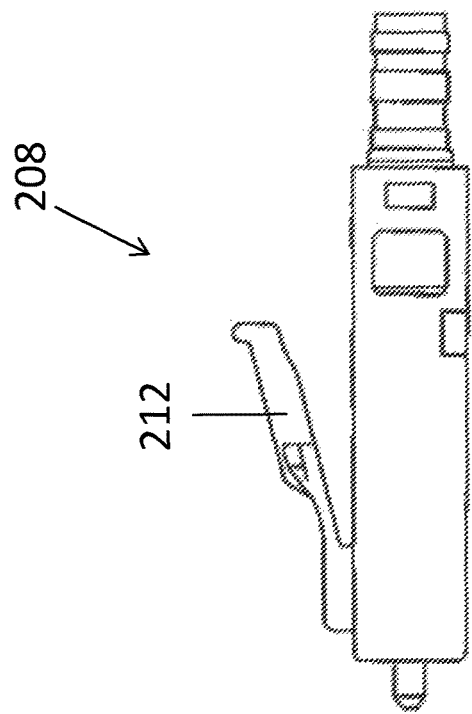
FIG. 2C is a top view of a prior art LC connector used in the embodiments shown in FIGS. 2A and 2B.
Figure 2D:
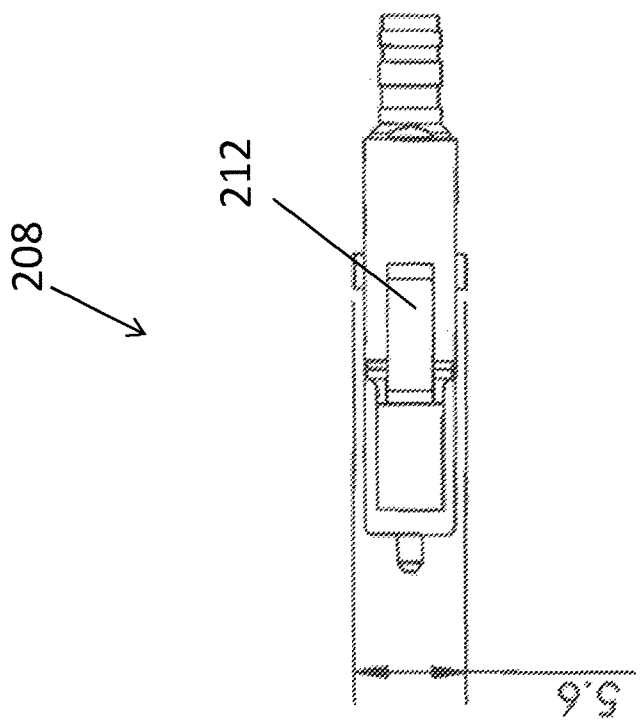
FIG. 2D is a side view of the prior art LC connector of FIG. 2C.

FIG. 2A shows a prior art LC duplex connector 200 that may be used with the conventional SFP 100 and the conventional adapter 106. The LC duplex connector 200 includes two conventional LC connectors 202. FIG. 2B shows another prior art LC duplex connector 204 having a remote release pull tab 206, and including two conventional LC connectors 208. As shown, the remote release pull tab includes two prongs 210, each configured to couple to the extending member 212 of a respective LC connector 208. FIGS. 2C and 2D show top and side views, respectively, of the conventional LC connector 208, having a width of 5.6 mm, and further showing the extending member 212.

Figure 3:
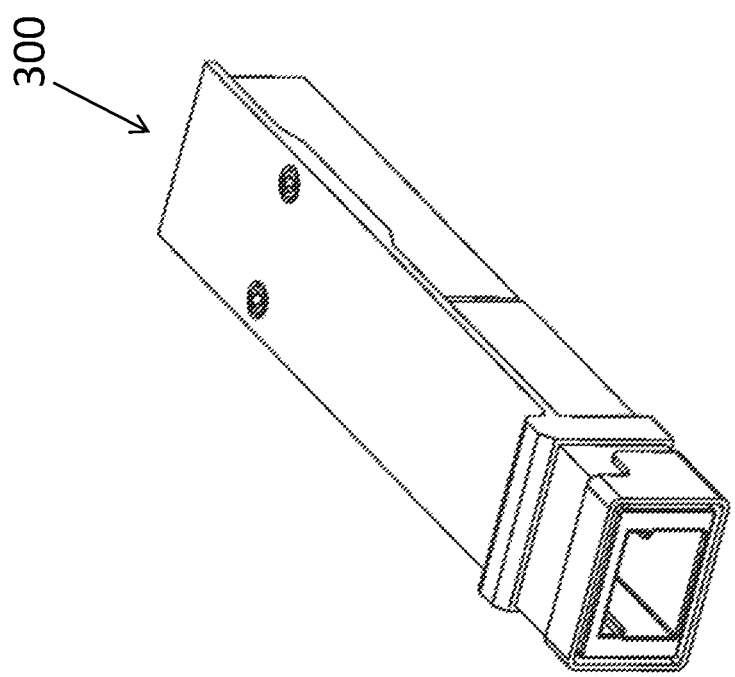
FIG. 3 is a perspective view of a future narrow pitch LC SFP for receiving connectors disclosed herein according to aspects of the present disclosure.

Various embodiments disclosed herein are configured for use with a future SFP, such as the narrow pitch LC SFP 300 shown in FIG. 3, having a pitch less than that of conventional 6.25 mm and 5.25 mm pitches. Various embodiments utilize LC type fiber optic connectors in duplex arrangements (having transmitting and receiving fibers) but with a connector axis-to-axis distance that is less than the conventional 6.25 mm and 5.25 mm pitches, as described further below.

Figure 4:
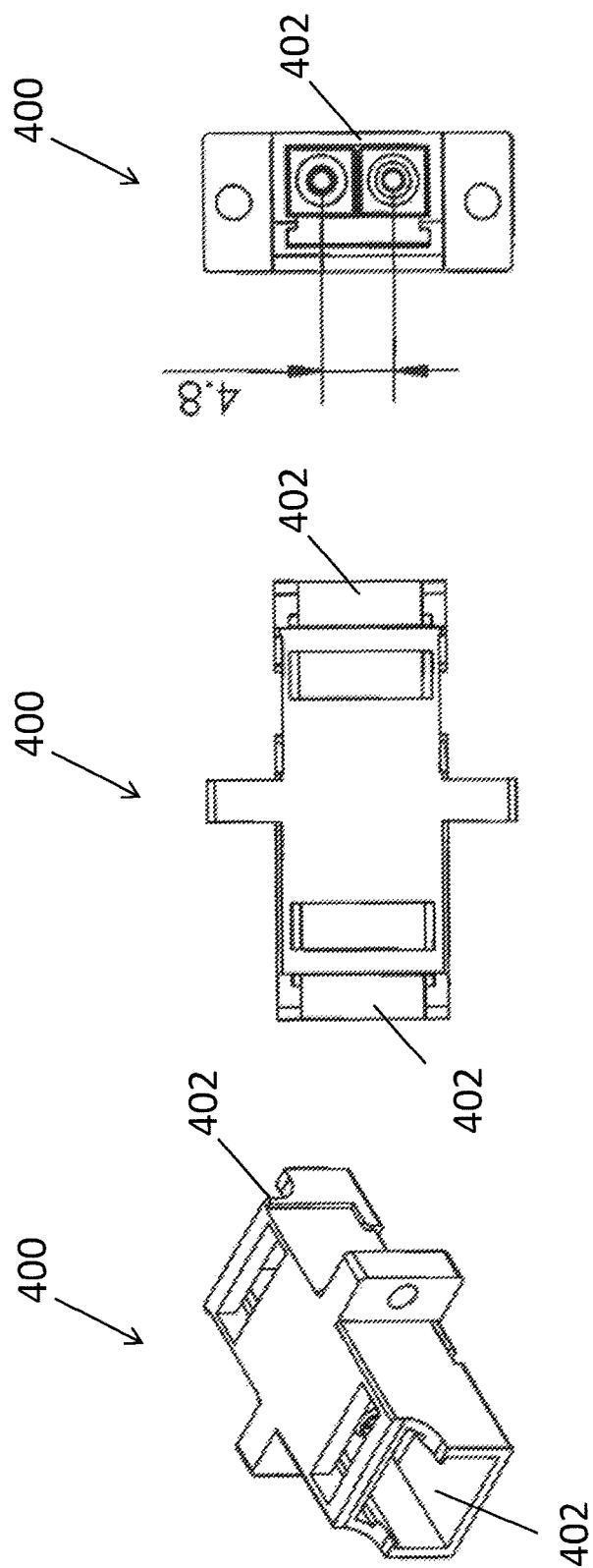
FIG. 4A is a perspective view of one embodiment of a narrow pitch LC adapter according to aspects of the present disclosure.
FIG. 4B is a top view of the narrow pitch LC adapter of FIG. 4A.
FIG. 4C is a front view of the narrow pitch LC adapter of FIG. 4A, showing a 4.8 mm pitch.

According to another aspect, there is disclosed embodiments of narrow pitch duplex LC adapters. FIGS. 4A to 4C show one embodiment of a narrow pitch adapter 400. The narrow pitch adapter 400 has receptacles 402 on opposite ends thereof, configured for mating two narrow pitch LC duplex connectors according to aspects disclosed herein. FIG. 4B shows a top view of the adapter 400. FIG. 4C shows a front view, further illustrating that the adapter 400 has a pitch of 4.8 mm. The adapter 400 is configured to receive a duplex LC connector, with a pitch of the adapter corresponding to the axis-to-axis distance between the LC connectors of the LC duplex connector. Although the adapter 400 has a pitch of 4.8 mm, various embodiments of narrow pitch adapters disclosed herein may have a different pitch that is less than that of the pitch of conventional adapters, for example less than 6.25 mm and less than about 5.25 mm. In some embodiments, the pitch may be about 4.8 mm or less.

In addition to the need for narrow connectors, there is a need for remote unlatching of the narrow connectors used in dense narrow SFP arrays. This is because finger access to connectors is nearly impossible without disruption to the service of adjacent optical fibers. Although there are current designs of remotely unlatching fiber optic connectors, as shown for example in FIG. 2B, they have proven to be difficult to function as desired when plugged into the die cast construction that is typical of all SFP's. The die cast SFP is not one that is ever free of sharp edges and internal flashing (burrs) that can interfere with the normal flexing motion of the plastic latches of the fiber optic connectors. The interference between metal edges and burrs may prevent the fiber optic connector's plastic latch from either becoming fully engaged or easily disengaged, especially with latches that are remotely triggered by pull tabs that project a distance behind the connector so as to keep fingers from disturbing adjacent optical fibers.

To make the latching/unlatching of the connectors from the SFP more reliable, various embodiments disclosed herein add a spring force to the remote latching component (pull tab), for example as shown and described in relation to FIGS. 5, 7, 8 and 12 below, to ensure that the connector latches are allowed to return to the undisplaced position and thereby become fully engaged inside the SFP's recess.

Figure 5:
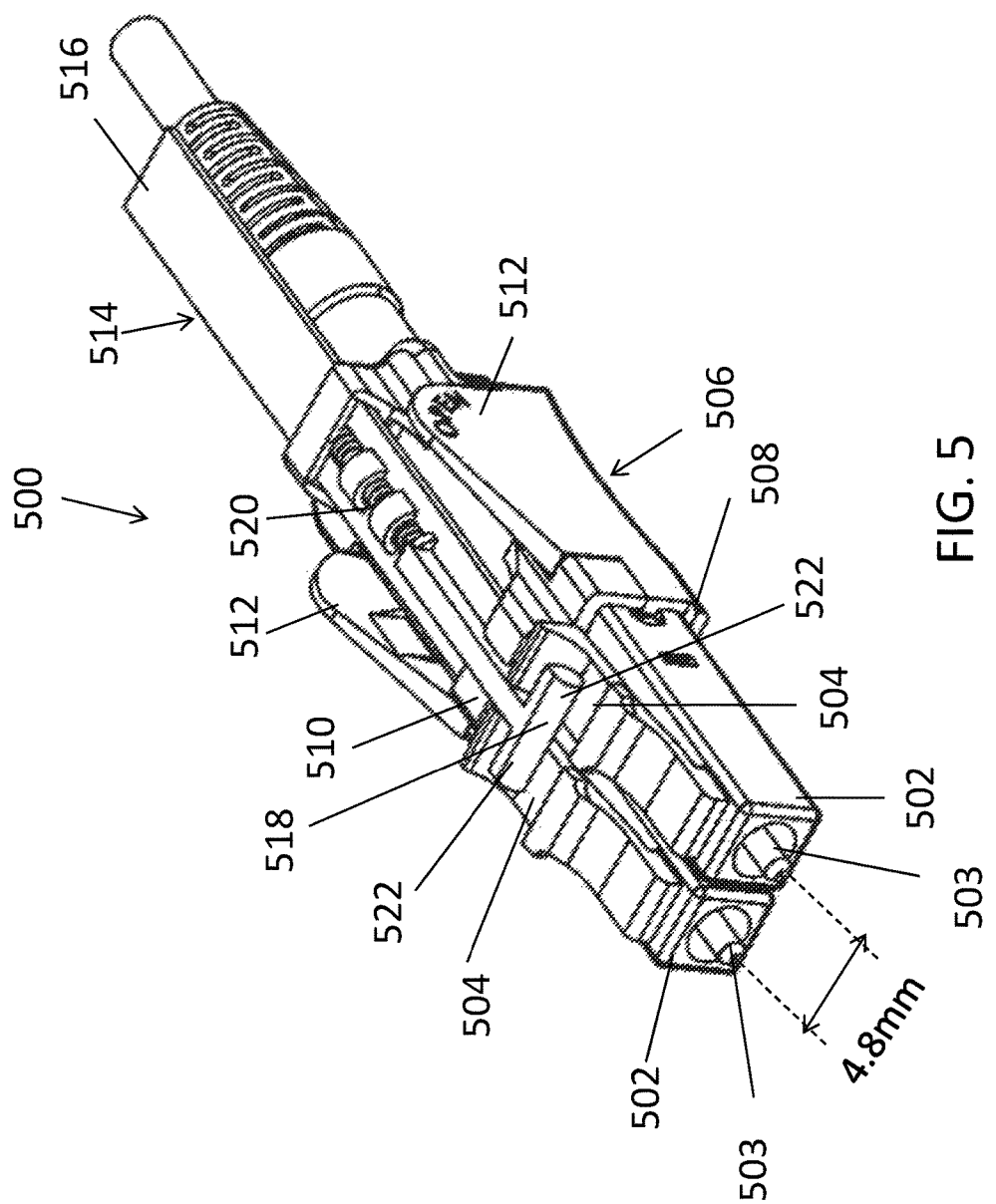
FIG. 5 is a perspective view of one embodiment of a narrow pitch LC duplex connector with remote release according to aspects of the present disclosure.

FIG. 5 shows one embodiment of a narrow pitch connector 500 according to aspects disclosed herein. The narrow pitch connector 500 is a duplex LC connector including two LC connectors 502. Each of the LC connectors 502 includes a respective ferrule 503 and a respective extending member or latching arm 504. The connector 500 has a pitch of 4.8 mm, defined as the axis-to-axis distance between the central axes of the LC connectors 502. In other embodiments, the connector pitch may be less than that of the pitch of conventional connectors, for example less than 6.25 mm and less than about 5.25 mm. In some embodiments, the pitch may be about 4.8 mm or less.

The connector 500 further includes a housing 506 having a bottom housing 508 and a top housing 510. The bottom housing 508 includes side walls 512. In various embodiments, the housing of the connector may be a switchable housing. The side walls may be configured to open so as to facilitate opening of the housing, for example to change polarity of the connector. The side walls 512 may be raised towards the rear of the connector, as shown in FIG. 5. One advantage of raising the side walls towards the rear of the connector is easier access. In other embodiments, the side walls may be raised at another location.

The connector 500 further includes a pull tab 514 having a distal end 516 and a proximal end 518. The pull tab 514 further includes a spring 520 configured to provide a force such that the connector latching arms 504 return to the undisplaced position and thereby become fully engaged inside the SFP's recess. The distal end 516 of the pull tab 514 may be pulled to remotely release the connector 500 from an SFP or adapter. The proximal end 518 of the pull tab 514 is uniquely shaped so as to engage with the unique profile of the latching arms 504 of the narrow pitch LC connector 500. The proximal end 518 engages both latching arms 504 of the duplex LC connector 500. That is, the proximal end 518 includes a single prong configured to engage the latching arms of both connectors 502. At the proximal end 518 of the pull tab 514 there are outwardly pointing pins 522 configured to rest directly above and slide along the semi-circular surface of latching arms 504 of the duplex LC connectors 502. The horizontal and rearward path direction of the pins 522 causes the semi-circular profile of the connector latching arms 504 to flex downward. Because the pins 522 are not contained inside ramped grooves of the connector latching arms 504, the pull tab 514 can also be pushed down at a location directly behind the LC connectors 502 rather than pulling the tab in a rearward motion from a remote distance behind the connectors, such as from the distal end 516. The action of pushing down the connectors' integral levers or latching arms 504 unlatches the connector 500. In some cases, the horizontal motion of the pull tab 514 may not be desirable. Thus, the connector latching arms 504 may be pushed down without resulting in a horizontal motion of the pull tab 514.

Figure 6B:
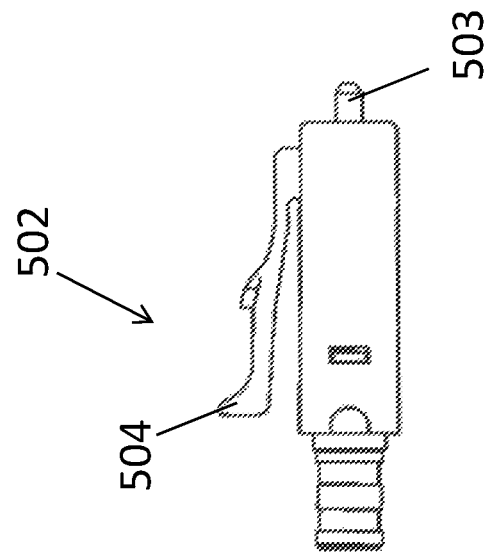
FIG. 6B is a side view of the LC connector of FIG. 6A according to aspects of the present disclosure.
Figure 6A:
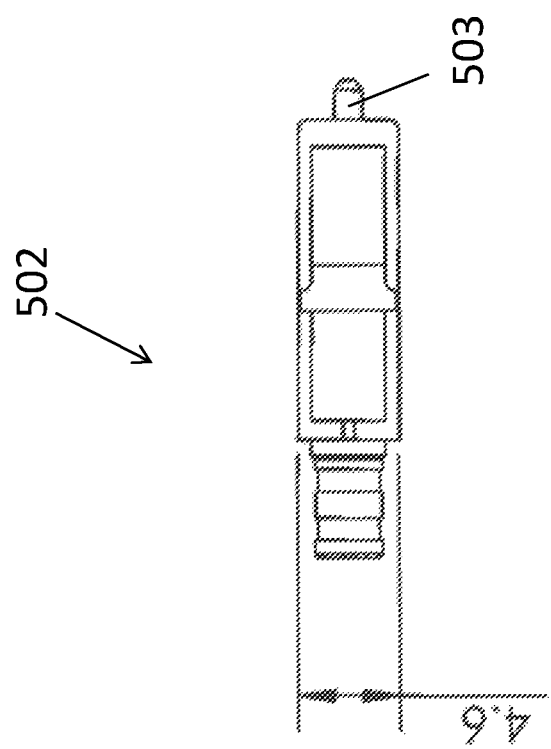
FIG. 6A is a top view of an LC connector used in the embodiment of FIG. 5 according to aspects of the present disclosure.

FIGS. 6A and 6B show top and side views, respectively, of the LC connector 502 of the narrow pitch connector 500.

FIG. 6A further shows that the LC connector 502 has a width of 4.6 mm. FIG. 6B shows the semi-circular profile of the latching arm 504.

Figure 7:
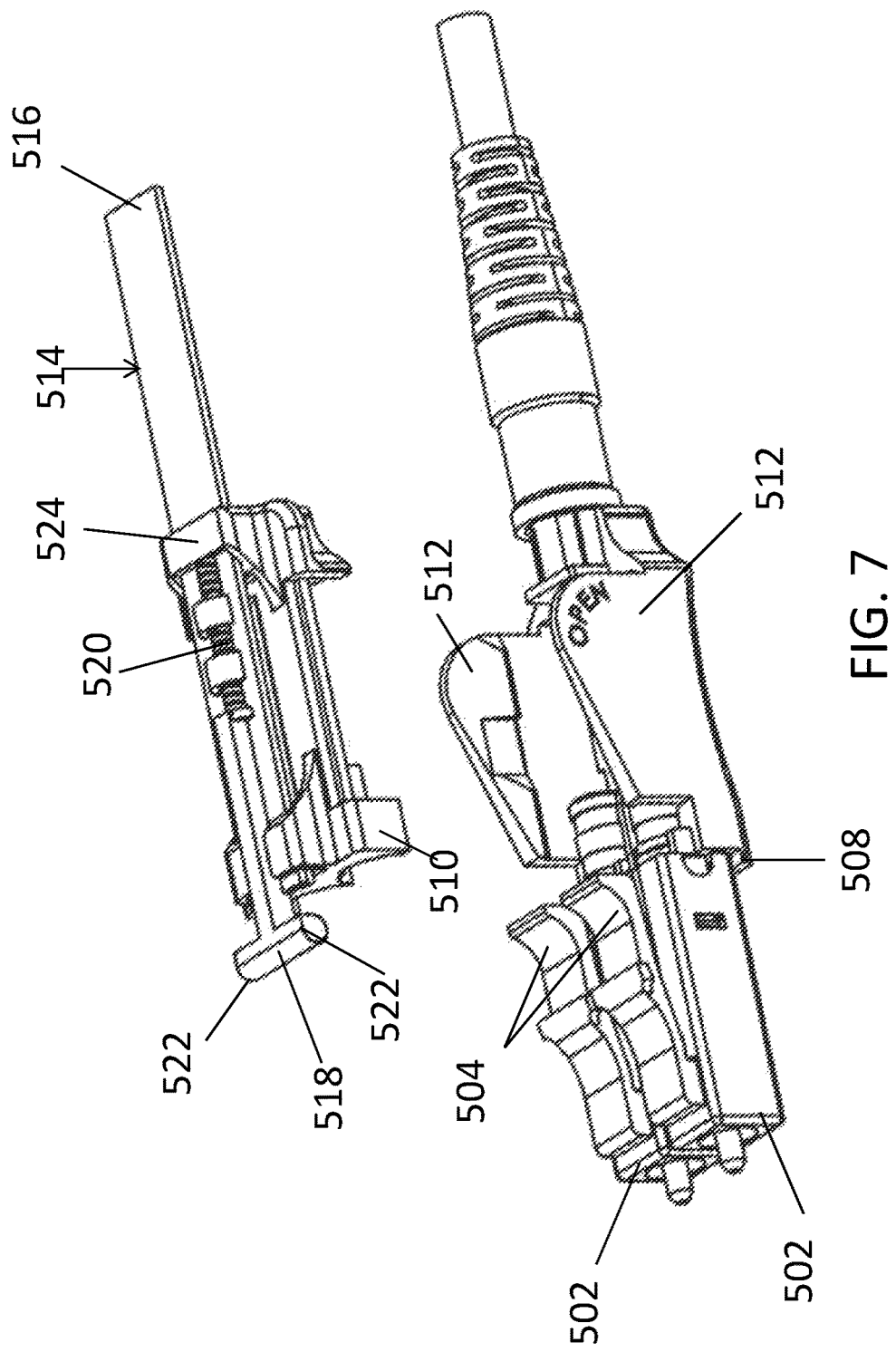
FIG. 7 is a perspective view of narrow pitch LC duplex connector of FIG. 5, with the release mechanism being removed according to aspects of the present disclosure.

FIG. 7 shows a partially disassembled view of the narrow pitch connector 500 of FIG. 5. The top housing 510 is separated from the bottom housing 508. The pull tab 514 is coupled to the top housing 510 and configured to slide longitudinally along the length of the connector. The top housing 510 also includes a restraint 524 configured to receive the pull tab 514.

Figure 8:
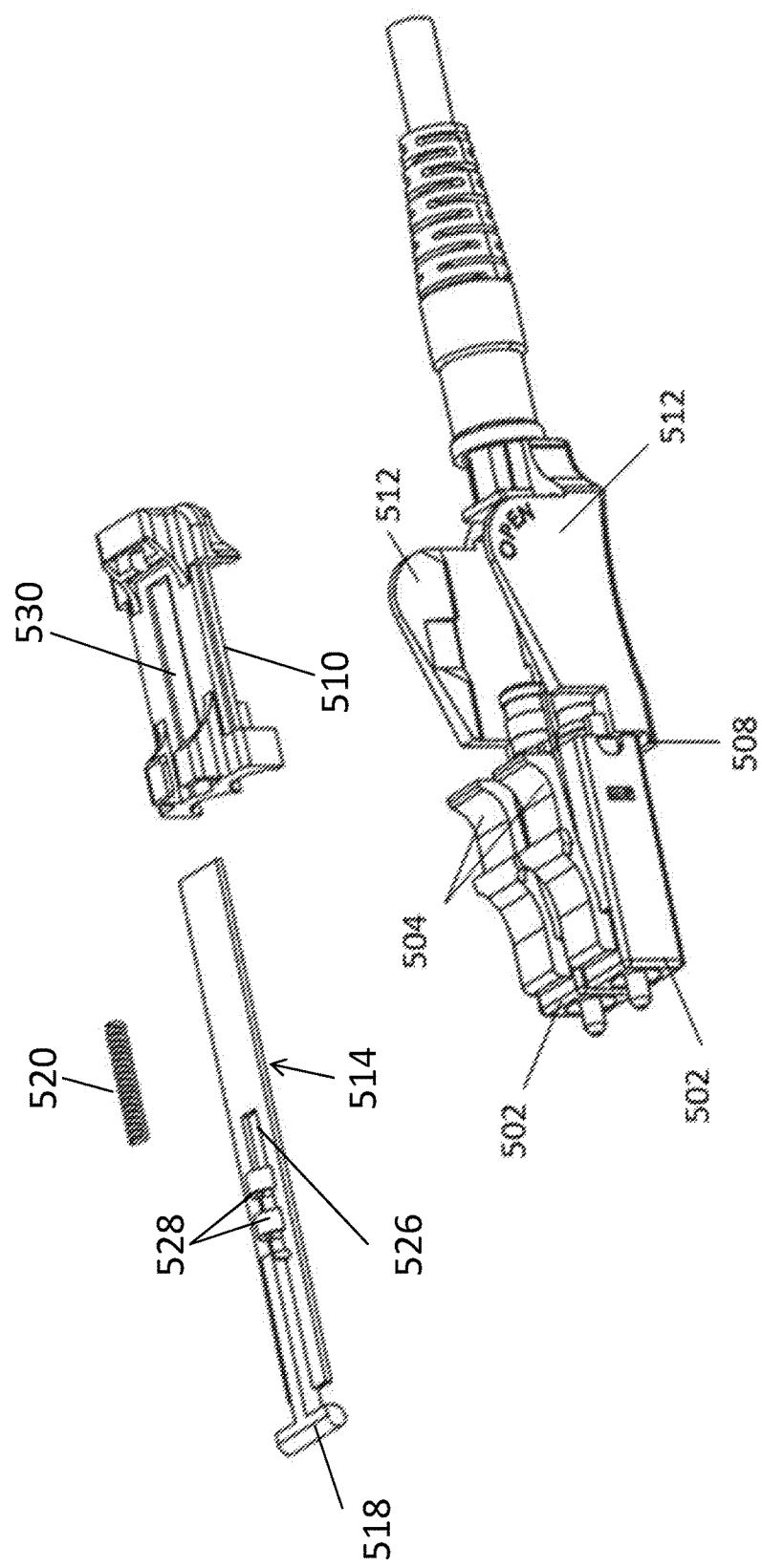
FIG. 8 is a perspective disassembled view of the narrow pitch LC duplex connector of FIG. 5 according to aspects of the present disclosure.

FIG. 8 shows a further disassembled view of the narrow pitch connector 500. Specifically, the pull tab 514 is shown to be separated from the top housing 510, and the spring 520 is removed from the pull tab. The pull tab 514 includes a longitudinal recess 526 configured to receive the spring 520, and at least one restraint 528 configured to retain the spring. The top housing 510 also includes a recess 530 configured to accommodate at least a portion of the pull tab 514, such as the spring 520 and the proximal end 518. In various embodiments, the pull tab may be removably coupled to the connector via the top housing.

Figure 9:
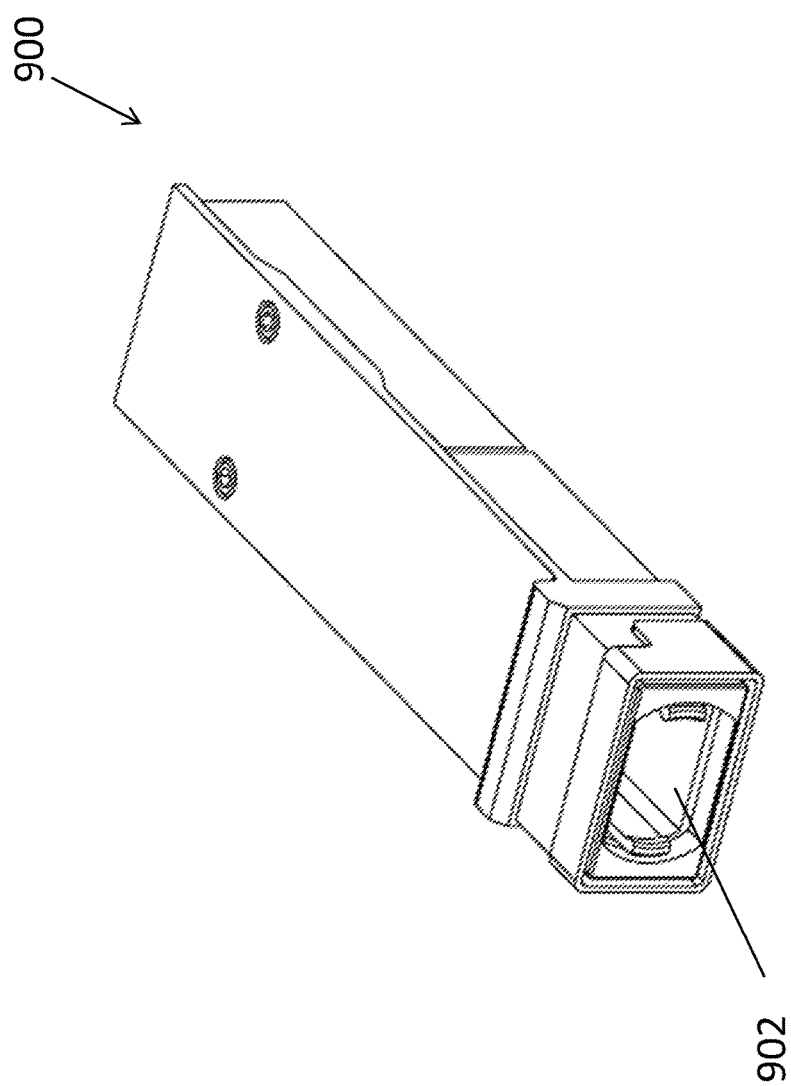
FIG. 9 is a perspective view of a prior art standard MPO SFP.

FIG. 9 shows a perspective view of a prior art standard MPO SFP 900. The SFP 900 is configured to receive a standard MPO connector, and provides a receptacle 902 for receiving an MPO connector having a conventional width, as shown for example in FIGS. 10A to 10C.

Figure 10A:
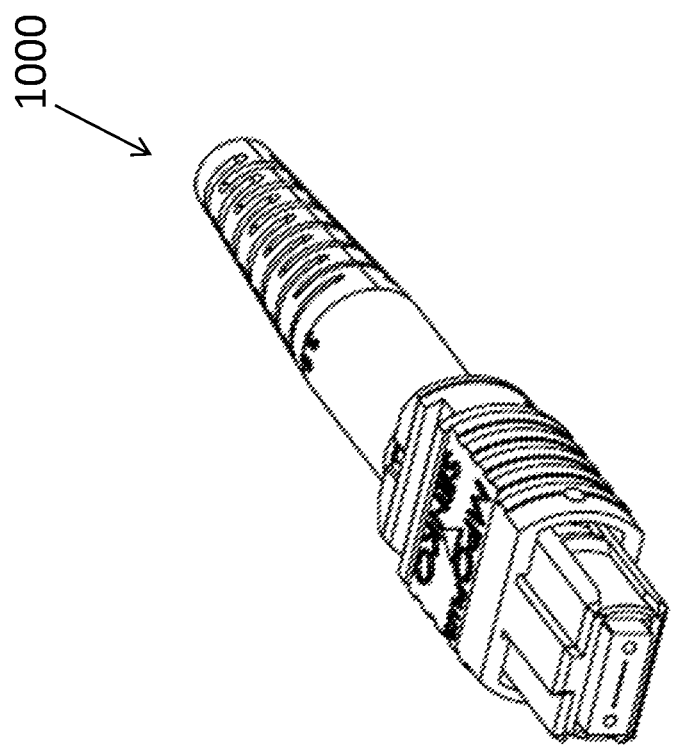
FIG. 10A is a perspective view of a prior art standard MPO connector.
Figure 10C:
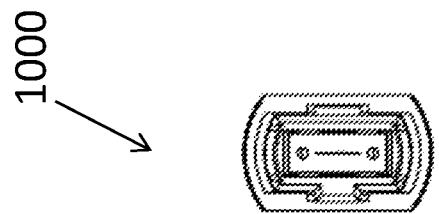
FIG. 10C is a front view of the prior art MPO connector of FIG. 10A.
Figure 10B:
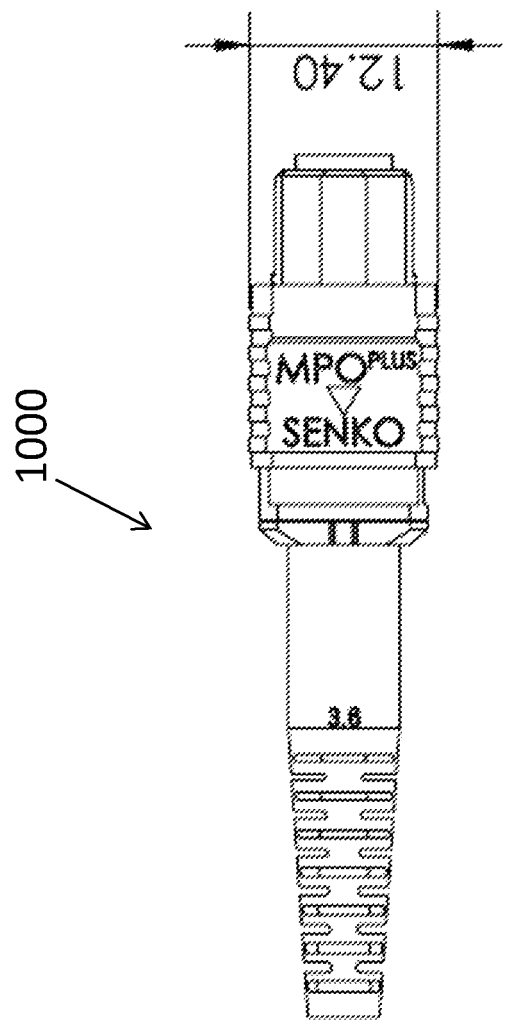
FIG. 10B is a top view of the prior art MPO connector of FIG. 10A, having a width of 12.4 mm.

FIG. 10A shows a perspective view of a conventional MPO connector 1000. As shown in FIG. 10B, the conventional MPO connector 1000 has a width of 12.4 mm. FIG. 10C shows a front view of the MPO connector 1000.

Figure 11:
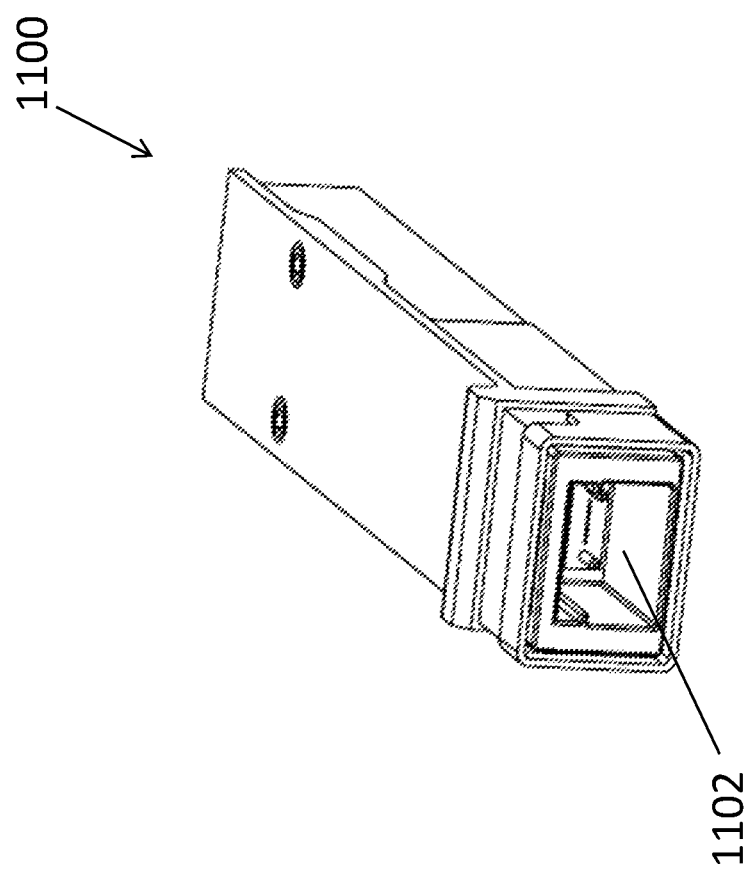
FIG. 11 is a perspective view of a future narrow width multi-fiber SFP for receiving connectors disclosed herein according to aspects of the present disclosure.

FIG. 11 shows an embodiment of a future narrow width multi-fiber SFP 1100 according to aspects of the present disclosure. Various embodiments disclosed herein are configured for use with the narrow width multi-fiber SFP 1100, having a width less than that of conventional MPO connectors, that is less than about 12.4 mm. The narrow width multi-fiber SFP has a receptacle 1102 configured to receive a narrow width multi-fiber connector, such as a narrow width connector having an MT ferrule.

Figure 12A:
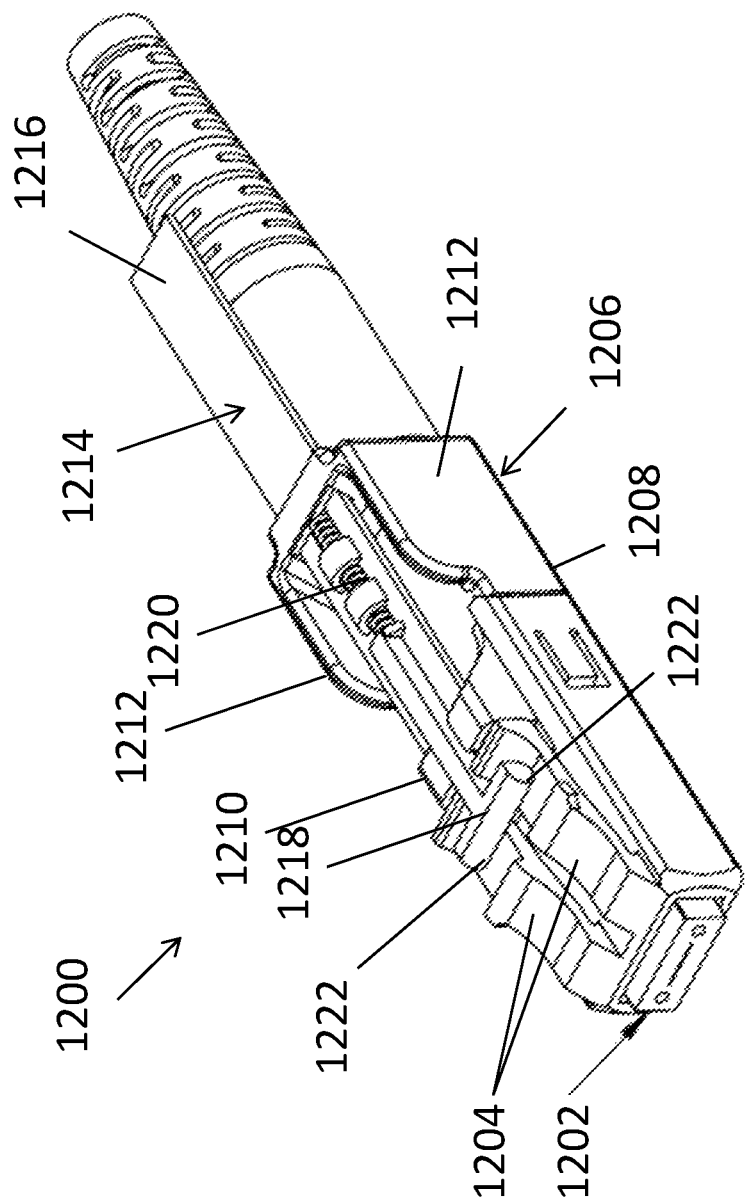
FIG. 12A is a perspective view of one embodiment of a narrow width multi-fiber connector with remote release according to aspects of the present disclosure.

FIG. 12A shows one embodiment of a narrow width connector 1200 according to aspects disclosed herein. The narrow width connector 1200 is a multi-fiber connector including a multi-fiber MT/MPO ferrule 1202. The connector 1200 includes two extending members or latching arms 1204. In other embodiments, the connector may include at least one latching arm. The connector 1200 has a width of 9.6 mm, as shown in the top view of the connector 1200 in FIG. 12B. In other embodiments, the connector width may be less than that of the width of conventional multi-fiber connectors, for example less than the 12.4 mm of the conventional MPO connector shown in FOG. 10B. In some embodiments, the width may be about 9.6 mm or less.

The connector 1200 further includes a housing 1206 having a bottom housing 1208 and a top housing 1210. The bottom housing 1208 includes side walls 1212. In various embodiments, the housing of the connector may be a switchable housing. The side walls may be configured to open so as to facilitate opening of the housing, for example to change polarity of the connector. The side walls 1212 may be raised towards the rear of the connector. One advantage of raising the side walls towards the rear of the connector is easier access. The side walls may also be raised at another location.

The connector 1200 further includes a pull tab 1214 having a distal end 1216 and a proximal end 1218. The pull tab 1214 further includes a spring 1220 configured to provide a force such that the connector latching arms 1204 return to the undisplaced position and thereby become fully engaged inside the SFP's recess. The distal end 1216 of the pull tab 1214 may be pulled to remotely release the connector 1200 from an SFP or adapter. The proximal end 1218 of the pull tab 1214 is uniquely shaped so as to engage with the unique profile of the latching arms 1204 of the narrow width multi-fiber connector 1200. The proximal end 1218 engages both latching arms 1204 of the multi-fiber connector 1200. That is, the proximal end 1218 includes a single prong configured to engage the latching arms 1204. At the proximal end 1218 of the pull tab 1214 there are outwardly pointing pins 1222 configured to rest directly above and slide along the semi-circular surface of latching arms 1204. The horizontal and rearward path direction of the pins 1222 causes the semi-circular profile of the connector latching arms 1204 to flex downward. Because the pins 1222 are not contained inside ramped grooves of the connector latching arms 1204, the pull tab 1214 can also be pushed down at a location directly behind the latching arms 1204 rather than pulling the tab in a rearward motion from a remote distance behind the connector, such as from the distal end 1216. The action of pushing down the connector's integral levers or latching arms 1204 unlatches the connector 1200. In some cases, the horizontal motion of the pull tab 1214 may not be desirable. Thus, the connector latching arms 1204 may be pushed down without resulting in a horizontal motion of the pull tab 1214.

Figure 12C:
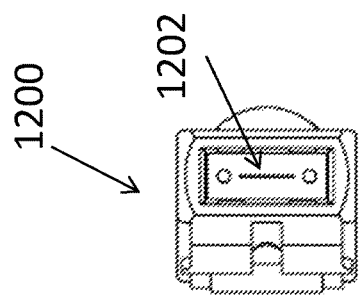
FIG. 12C is a front view of the narrow width multi-fiber connector of FIG. 12A according to aspects of the present disclosure.
Figure 12B:
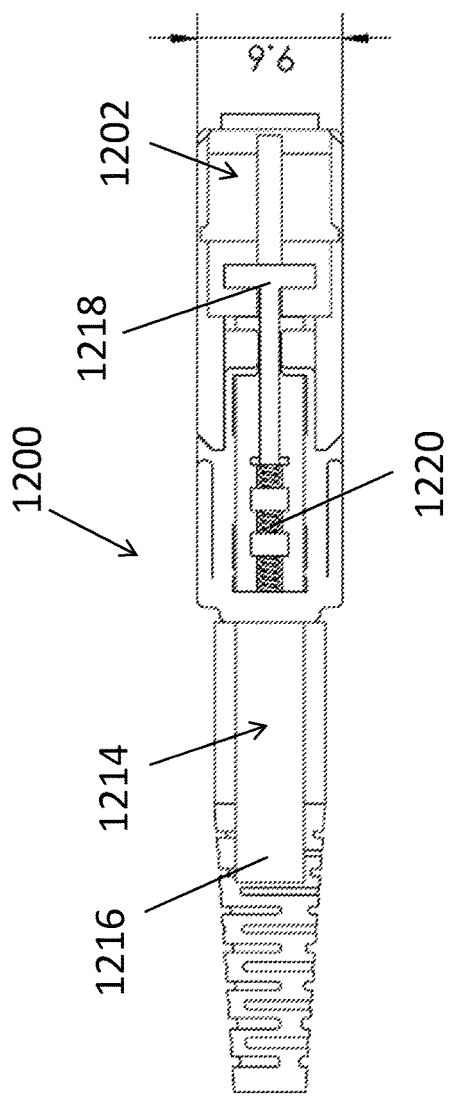
FIG. 12B is a top view of the narrow width multi-fiber connector of FIG. 12A, having a width of 9.6 mm according to aspects of the present disclosure.

FIGS. 12B and 12C show top and front views, respectively, of the narrow width multi-fiber connector 1200. FIG. 12B further shows that the connector 1200 has a width of 9.6 mm.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera As a non-limiting example, each range discussed herein can be readily broken down into a lower third, middle third and upper third, et cetera As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A narrow pitch fiber optic connector comprising:
a plurality of LC connectors arranged such that a pitch of said narrow pitch connector is less than about 5.25 mm;
a plurality of latching arms coupled to the plurality of LC connectors;
a housing configured to hold the plurality of LC connectors; and
a pull tab coupled to the plurality of latching arms and configured to remotely unlatch the narrow pitch connector, the pull tab being further configured to be pushed down so as to unlatch the narrow pitch connector without resulting in a horizontal movement of the pull tab.

2. The narrow pitch fiber optic connector of claim 1, wherein the pitch is less than or equal to about 4.8 mm.

3. The narrow pitch fiber optic connector of claim 1, wherein the pull tab includes a spring configured to provide a force such that the latching arms return to an undisplaced position.

4. The narrow pitch fiber optic connector of claim 3, wherein the pull tab includes a distal end for remotely unlatching the narrow pitch connector and a proximal end configured to couple the pull tab to the plurality of latching arms.

5. The narrow pitch fiber optic connector of claim 4, wherein the proximal end includes a single prong configured to engage the plurality of latching arms.

6. The narrow pitch fiber optic connector of claim 5, wherein the proximal end includes a plurality of pins configured to slide along a semi-circular profile of the plurality of latching arms.

7. The narrow pitch fiber optic connector of claim 1, wherein the narrow pitch connector is a duplex connector.

8. The narrow pitch fiber optic connector of claim 1, wherein the housing includes a bottom housing and a top housing coupled to the bottom housing.

9. The narrow pitch fiber optic connector of claim 8, wherein the bottom housing includes a side wall configured to open.

10. The narrow pitch fiber optic connector of claim 9, wherein the side wall includes a raised profile at a rear end thereof.

11. The narrow pitch fiber optic connector of claim 8, wherein the top housing is configured to retain the pull tab.

12. A duplex fiber optic connector comprising:
two LC connectors arranged such that a pitch of said duplex LC connector is less than about 5.25 mm; and
a pull tab coupled to said two LC connectors so as to remotely unlatch said duplex connector when pulled horizontally, wherein the pull tab is spring loaded, the pull tab being further configured to be pushed down so as to unlatch the duplex connector without resulting in a horizontal movement of the pull tab.

13. The duplex fiber optic connector of claim 12, wherein the pull tab includes a proximal end configured to couple to respective latching arms of the two LC connectors.

14. The duplex fiber optic connector of claim 12, further comprising a housing having side walls configured to open, wherein the housing further comprises a top housing configured to receive the pull tab.

15. A narrow width fiber optic connector comprising:
a multi-fiber connector, wherein a width of said narrow width fiber optic connector is less than about 12.4 mm;
at least one latching arm coupled to the multi-fiber connector;
a housing configured to hold the multi-fiber connector; and
a pull tab coupled to the at least one latching arm and configured to remotely unlatch the narrow width connector, the pull tab being further configured to be pushed down so as to unlatch the narrow width connector without resulting in a horizontal movement of the pull tab.

16. The narrow width fiber optic connector of claim 15, wherein the multi-fiber connector includes a multi-fiber MT ferrule.

17. The narrow width fiber optic connector of claim 15, wherein the width is less than or equal to about 9.6 mm.

18. The narrow width fiber optic connector of claim 15, wherein the pull tab includes a spring configured to provide a force such that the at least one latching arm returns to an undisplaced position.

\* \* \* \* \*